(12) United States Patent
Lu et al.

(10) Patent No.: US 11,828,934 B1
(45) Date of Patent: Nov. 28, 2023

(54) HIGH-DISPERSION OPTICAL COMPONENTS AND METHODS FOR MAKING THE SAME

(71) Applicant: X Development LLC, Mountain View, CA (US)

(72) Inventors: Jesse Lu, East Palo Alto, CA (US); Brian John Adolf, San Mateo, CA (US); Martin Friedrich Schubert, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 862 days.

(21) Appl. No.: 16/508,175

(22) Filed: Jul. 10, 2019

(51) Int. Cl.
*G02B 27/00* (2006.01)
*G06F 30/00* (2020.01)
*G06F 111/10* (2020.01)

(52) U.S. Cl.
CPC ......... *G02B 27/0012* (2013.01); *G06F 30/00* (2020.01); *G06F 2111/10* (2020.01)

(58) Field of Classification Search
CPC .......... G06F 30/23; G06F 30/00; G06F 30/10; G06F 30/12; G06F 2111/00–2119/22; G02B 27/0012
See application file for complete search history.

(56) References Cited

U.S. PATENT DOCUMENTS

| | | |
|---|---|---|
| 6,356,681 B1 | 3/2002 | Chen |
| 6,408,119 B1 | 6/2002 | Meltz et al. |
| 6,456,762 B1 | 9/2002 | Nishiki |
| 6,477,194 B1 | 11/2002 | Eng |
| 6,681,067 B1 | 1/2004 | Kersey |
| 6,768,850 B2 | 7/2004 | Dugan et al. |
| 6,847,762 B2 | 1/2005 | Sweetser et al. |
| 6,946,684 B2 | 9/2005 | Shigihara |
| 6,956,994 B2 | 10/2005 | Bernard |
| 8,380,027 B2 | 2/2013 | Reed |

(Continued)

OTHER PUBLICATIONS

Piggott, A. "Automated Design of Photonic Devices" [Thesis] Department of Electrical Engineering, Stanford University [retrieved on Mar. 11, 2022] (Year: 2018).*

(Continued)

*Primary Examiner* — Rehana Perveen
*Assistant Examiner* — Alfred H B Wechselberger
(74) *Attorney, Agent, or Firm* — Fish & Richardson P.C.

(57) ABSTRACT

A computer-implemented method for designing a dispersive optical component includes: (i) defining a loss function within a simulation space composed of multiple voxels, the simulation space encompassing optical interfaces of the component, the loss function corresponding to a target dispersion profile for the component including a relationship between a scattering angle and a wavelength of an incident electromagnetic field for different operative wavelengths; (ii) defining an initial structure for the optical interfaces, at least some of the voxels corresponding to each optical interface having a dimension smaller than a smallest operative wavelength of the component; and (iii) determining, using a computer system, a structure for each optical interface using a finite-difference time domain solver to solve Maxwell's equations so that a loss determined according to the loss function is above a specified threshold.

19 Claims, 6 Drawing Sheets

(56) References Cited

U.S. PATENT DOCUMENTS

| | | | |
|---|---|---|---|
| 10,592,732 | B1 | 3/2020 | Sather et al. |
| 11,092,746 | B1 | 8/2021 | Adolf et al. |
| 11,604,957 | B1 | 3/2023 | Schubert et al. |
| 2003/0186142 | A1 | 10/2003 | Deshmukh et al. |
| 2004/0028104 | A1 | 2/2004 | Buda |
| 2004/0196884 | A1 | 10/2004 | Ohkubo |
| 2005/0226558 | A1 | 10/2005 | Kim et al. |
| 2006/0078258 | A1 | 4/2006 | Anisimov et al. |
| 2008/0013581 | A1 | 1/2008 | Kobayashi |
| 2008/0089374 | A1 | 4/2008 | Eichler |
| 2010/0142566 | A1 | 6/2010 | Liu et al. |
| 2011/0102799 | A1 | 5/2011 | Matejka et al. |
| 2016/0012176 | A1 | 1/2016 | Liu et al. |
| 2016/0164260 | A1 | 6/2016 | Chua |
| 2017/0024356 | A1 | 1/2017 | Angerer |
| 2017/0179680 | A1 | 6/2017 | Mahgerefteh |
| 2018/0024297 | A1 | 1/2018 | Bovington et al. |
| 2018/0045953 | A1 | 2/2018 | Fan et al. |
| 2018/0053334 | A1 | 2/2018 | Schneider |
| 2019/0097722 | A1 | 3/2019 | McLaurin et al. |
| 2019/0179016 | A1 | 6/2019 | Raring et al. |
| 2020/0050715 | A1 | 2/2020 | Krishnannurthy et al. |
| 2020/0226221 | A1 | 7/2020 | Lu et al. |
| 2021/0007702 | A1 | 1/2021 | Lee et al. |
| 2021/0305767 | A1 | 10/2021 | Schubert et al. |

OTHER PUBLICATIONS

Molesky et al. "Inverse design in nanophotonics" Nature Photonics, vol. 12, Nov. 2018, pp. 659-670; https://doi.org/10.1038/s41566-018-0246-9 [retrieved on Feb. 22, 2022] (Year: 2018).*

Frei et al. "Topology optimization of a photonic crystal waveguide termination to maximize directional emission" Appl. Phys. Lett. 86, 111114 [retrieved on Feb. 22, 2022] (Year: 2005).*

Tasyurek, E. "Wavelength Demultiplexing Using Multilayer Structures With Frustrated Total Internal Reflection" [Thesis] Department of Electrical Engineering, Stanford University [retrieved on Nov. 9, 2022] (Year: 2015).*

Ingersoll, G. "Multiplexed Voume Bragg Gratings in Narrowand Broad-band Spectral Systems: Analysis and Application" [Thesis] Graduate School, University of Minnesota [retrieved on Nov. 9, 2022] (Year: 2015).*

Stavdas et al. "Optical Multiplexing and Demultiplexing" Encyclopedia of Telecommunications [retrieved on Nov. 9, 2022]. Retrieved from <<https://www.researchgate.net/publication/229479977_Optical_Multiplexing_and_Demultiplexing/link/61080e5c0c2bfa282a178420/download>> (Year: 2003).*

Andkjaer et al. "Topology-optimized broadband surface relief transmission grating" Proc. SPIE 8980, Physics and Simulation of Optoelectronic Devices XXII, 898006; doi: 10.1117/12.2036997 [retrieved on Mar. 14, 2022] (Year: 2014).*

Ghanem et al. "Information Fusion: Scaling Subspace-Driven Approaches" arXiv:2204.12035 [cs.LG] (Year: 2022).*

Chandler, "New system allows optical "deep learning"," Jun. 2017, retrieved on Oct. 9, 2018, retrieved from URL <http://news.mit.edu/2017/new-system-allows-optical-deep-learning-0612>, 3 pages.

Lee et al., "Metasurface eyepiece for augmented reality," Nature Communications, Nov. 2018, 10 pages.

Molesky, "Outlook for inverse design in nanophotonics," https://arxiv.org/abs/1801.06715, Jan. 2018, 13 pages.

Piggott et al., "Fabrication-constrained nanophotonic inverse design," Scientific Reports, May 2017, 7 pages.

Piggott et al., "Supplementary Information: Fabrication-constrained nanophotonic inverse design," retrieved from URL <https://static-content.springer.com/esm/art%3A10.1038%2Fs41598-017-01939-2/MediaObjects/41598_2017_1939_MOESM2_ESM.pdf>, May 2017, 10 pages.

Tahersima et al., "Deep Neural Network Inverse Design of Integrated Nanophotonic Devices," https://arxiv.org/abs/1809.03555, Sep. 2018, 8 pages.

Damask, "Integrated-Optic Grating-Based Filters for Optical Communications Systems," Thesis for the degree of Doctor of Philosophy, Massachusetts Institute of Technology, May 6, 1996, 282 pages.

Winick et al., "Design of Grating-Assisted Waveguide Couplers with Weighted Coupling," Journal of Lightwave Technology, Nov. 1991, 9(11):1481-1491.

Bernhardi, "Fourteen Philosophy Thesis Topic Ideas for University Students," Dissertation for the degree of Doctor University of Twente, Integrated Optical MicroSystems (IOMS) group, Faculty of Electrical Engineering, Mathematics and Computer Science, MESA+ Institute for Nanotechnology, Apr. 1982, 169 pages.

Udupa et al., "Voxelized Topology Optimization for Fabrication Compatible Inverse Design of 3D Photonic Devices," Optics Express, Jul. 2019, 27(15):21988-21998.

Yin, "Photonic Inverse Design for 3-D Structures and Optical Phase Change Materials," Massachusetts Institute of Technology, Jun. 2019, 85 pages.

Borel et al., "Topology optimization and fabrication of photonic crystal structures," Optics Express, May 2004, 12(9):6 pages.

Boutanni et al., "Efficient pixel-by-pixel optimization of photonic devices utilizing the Dyson's equation in a Green's function formalism: Part II. Implementation using standard electromagnetic solvers," Journal of the Optical Society of America, Sep. 2019, 36(9)2387-2394.

Molesky et al., "Inverse design in nanophotonics," Nature Photonics, Nov. 2018, 12:659-670.

Piggot, "Automated Design of Puotonic Devices," Dissertation for the degree of Doctor of Philosophy, Stanford University, Department of Electrical Engineering, Jun. 2018, 114 pages.

Xu et al., "Navigating through complex photonic design space using machine learning methods," SPIE Optics + Optoelectronics, Apr. 2019, 11031:110310S-1.

Yu et al., "Inverse-Design-based Light Via for Multi-Layer Photonic Integration Circuit," 2018 Asia Communications and Photonics Conference, 2018, 3 pages.

Mauricio et al., "Design Framework for nnetasurface optics-based convolutional neural networks," Applied Optics, May 2021, 60(15):4356-4365.

Sitzmann et al., "End-to-end Optimization of Optics and Image Processing for Achromatic Extended Depth of Field and Super-resolution Imaging," ACM Trans. Graph., Aug. 2018, 37(4):1-13.

Guo et al. "Study on a Recurrent Convolutional Neural Network Based FDTD Method," 2019 International Applied Computational Electromagnetics Society Symposium—China (ACES), Oct. 31, 2022, 9 pages.

Hughes, "Adjoint-Based Optimization and Inverse Design oh Photonic Devices," Thesis for the degree of Doctor of Philosophy, Stanford University, Department of Applied Physics, Aug. 2019, 158 pages.

Kores et al., "Temperature Dependence of the Spectral Characteristics of Distributed-Feedback Resonators," Optics Express, Feb. 19, 2018, 26(4):4892-905.

Lai et al., "Distributed Bragg Reflector Fiber Laser Fabricated by Frmtosecond Laser Inscription," Optics Letters, Jun. 2006, 31(11): 3 pages.

Li et al., "Enabling High Performance Deep Learning Networks on Embedded Systems," IECON 2017—43rd Annual Conference of the IEEE Industrial Electronics Society, Nov. 1, 2022, 6 pages.

TaherSima et al., "Nanostructured Photonic Power Splitter Design via Convolutional Neural Networks," 2019 Conference on Lasers and Electro-Optics, Oct. 31, 2022, 2 pages.

Wikipedia.com (Online) "Kernel (image processing))," Dec. 7, 2019, retrieved on Oct. 11, 2022, retrieved from URL<https://en.wikipedia.org/w/index.php?title=Kernel_(image_processing)&oldid=929690058», 6 pages.

Trivedi, et al., "Data-driven acceleration of photonic simulations," Scientific Reports, Dec. 23, 2019, 9:19728.

* cited by examiner

HIGH-DISPERSION OPTICAL COMPONENTS AND METHODS FOR MAKING THE SAME

BACKGROUND

Controllably directing light into varying optical modes is useful in many applications such as optical sensing (e.g., LIDAR) and optical imaging. Conventional techniques of obtaining such a functionality include using actuating mirrors (i.e., MEMS mirrors) and electrically-, acoustically- or thermally-tuned arrays of output gratings. Alternatively, one can use a highly-dispersive element or elements which couple a broad band of input wavelengths into a broad array of output modes. Such approaches may be desirable because of the availability of good broadband light sources as well as the possibility of eliminating actuatable elements (e.g., mechanically, electrically, acoustically, or thermally).

SUMMARY

The disclosure features dispersive photonic components suitable for operation across a large band of wavelengths and/or spatial modes and techniques for designing such elements using a computational inverse design tool. Specifically, the dispersive photonic components are designed based on a loss function defining a desired dispersion profile for the photonic component, such as scattering angle versus wavelength characteristics, and optimizing the composition and structure of the photonic component by numerically solving Maxwell's equations for optical modes of interest using, e.g., a finite-difference time domain method. Solutions to the inverse problem may be subject to other constraints, such as manufacturability of the interface.

The dispersive components can be used in a variety of applications requiring controllably directing light into different optical modes, such as optical sensing and optical imaging applications.

In general, in a first aspect, the disclosure features a computer-implemented method for designing a dispersive optical component, the method including: (i) defining a loss function within a simulation space composed of multiple voxels, the simulation space encompassing one or more optical interfaces of the dispersive optical component, the loss function corresponding to a target dispersion profile for the optical component, the target dispersion profile including a relationship between a scattering angle and a wavelength of an incident electromagnetic field for three or more different operative wavelengths; (ii) defining an initial structure for the one or more optical interfaces in the simulation space, at least some of the voxels corresponding to each optical interface having a dimension smaller than a smallest operative wavelength of the dispersive optical component; and (iii) determining, using a computer system, a structure for each optical interface using a finite-difference time domain solver to solve Maxwell's equations so that a loss determined according to the loss function is above a specified threshold.

Implementations of the method can include one or more of the following features. For example, the target dispersion profile can include directing electromagnetic radiation at different wavelengths into different scattering angles for each of the plurality of operative wavelengths in response to illuminating the optical component with an input electromagnetic field including each of the plurality of operative wavelengths.

The target dispersion profile can be defined for a near field electromagnetic field exiting the dispersive optical component.

The target dispersion profile can be defined for a far field electromagnetic field exiting the dispersive optical component.

The loss can be determined from the loss function for each of a plurality of electromagnetic modes of the incident electromagnetic field at each of the operative wavelengths.

The initial structure can include a first sub-structure dispersive for an incident electromagnetic field at at least one of the operative wavelengths. The first sub-structure can include a grating.

Determining the structure can include determining a refractive index at each voxel corresponding to the dispersive optical component. The refractive index at each voxel can correspond to a refractive index of one or more pre-identified optical materials. The pre-identified optical materials can include dielectric materials and/or semiconductor materials.

The method can include defining one or more manufacturing constraints, wherein the structure is determined subject to the one or more manufacturing constraints. The manufacturing constraints can include constraints on values of refractive index at each voxel, the refractive index values corresponding to materials suitable for forming the dispersive optical component. In some embodiments, the manufacturing constraints include constraints on feature dimensions of the dispersive optical component. The feature dimensions may include one or more dimensions selected from the group of feature dimensions consisting of: radius of curvature, width, and volume.

The dispersive optical component can be a transmissive optical component or a reflective optical component.

The operative wavelengths can include infrared wavelengths.

The operative wavelengths can correspond to wavelengths from a broadband light source.

At least some of the voxels (e.g., all of the voxels) can be smaller than the operative wavelengths in three orthogonal dimensions.

In general, in a further aspect, the disclosure features a system for designing a dispersive optical component, including one or more data processing apparatus configured to receive information defining: (i) a loss function within a simulation space composed of multiple voxels, the simulation space encompassing one or more optical interfaces of the dispersive optical component, the loss function corresponding to a target dispersion profile for the optical component, the target dispersion profile including a relationship between a scattering angle and a wavelength of an incident electromagnetic field for three or more different operative wavelengths; and (ii) an initial structure for the one or more optical interfaces in the simulation space, at least some of the voxels corresponding to each optical interface having a dimension smaller than a smallest operative wavelength of the dispersive optical component. The one or more data processing apparatus are programmed to determine a structure for each optical interface using a finite-difference time domain solver to solve Maxwell's equations so that a loss determined according to the loss function is above a specified threshold.

Embodiments of the system can include one or more features of other aspects.

In general, in another aspect, the disclosure features a non-transitory computer readable medium storing a program causing a computer to execute a process for designing a dispersive optical component, the process including: (i) defining a loss function within a simulation space composed of multiple voxels, the simulation space encompassing one or more optical interfaces of the dispersive optical component, the loss function corresponding to a target dispersion profile for the optical component, the target dispersion profile including a relationship between a scattering angle and a wavelength of an incident electromagnetic field for three or more different operative wavelengths; (ii) defining an initial structure for the one or more optical interfaces in the simulation space, at least some of the voxels corresponding to each optical interface having a dimension smaller than a smallest operative wavelength of the dispersive optical component; and (iii) determining, using a computer system, a structure for each optical interface using a finite-difference time domain solver to solve Maxwell's equations so that a loss determined according to the loss function is above a specified threshold.

Embodiments of the computer readable medium can include one or more features of other aspects.

Among other advantages, the disclosed techniques offer methods for designing custom, highly dispersive, highly optimized photonic components, applicable across a variety of applications.

Other advantages will be evident from the description below, the figures, and the claims.

DETAILED DESCRIPTION

Figure 1:
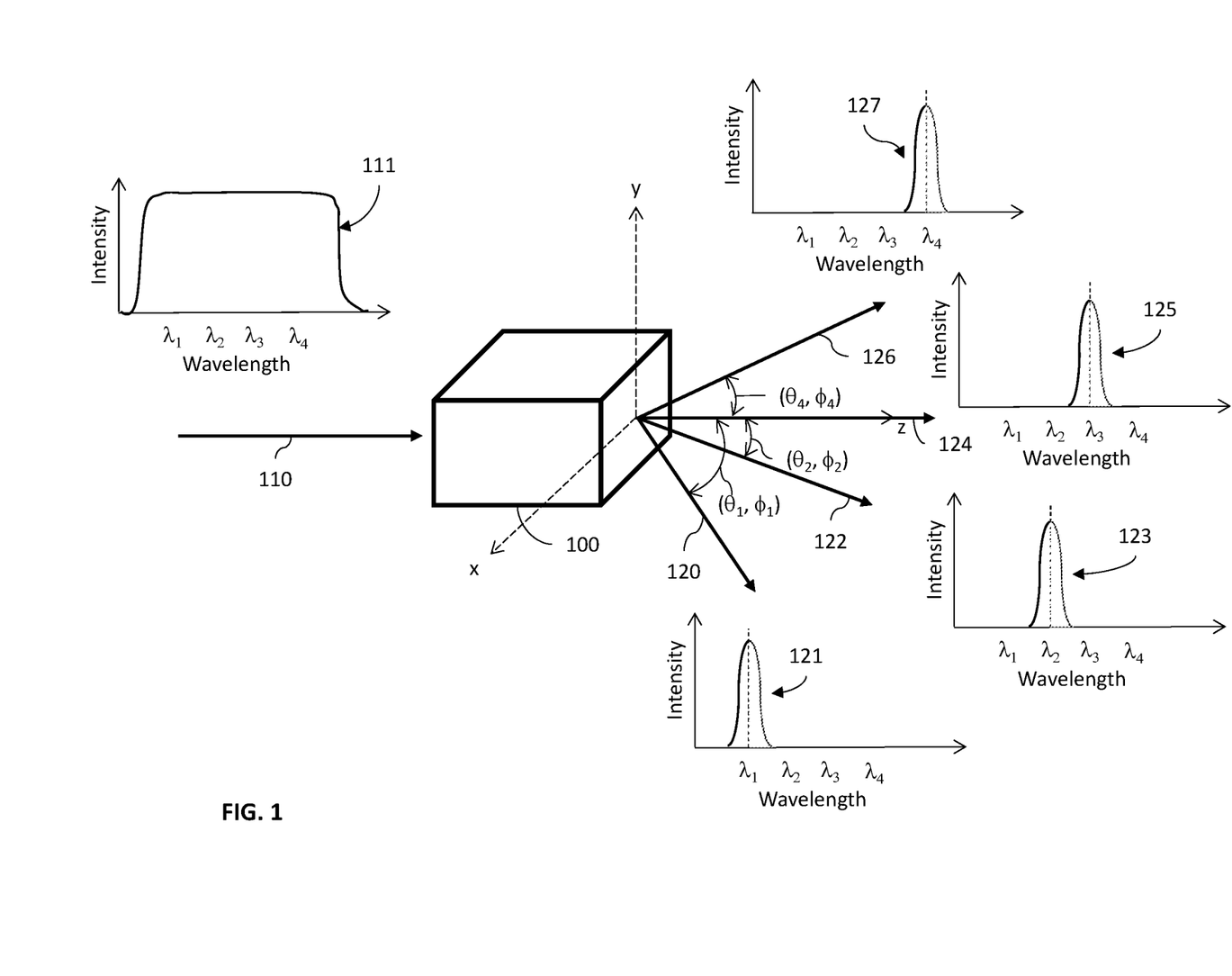
FIG. 1 is a schematic diagram illustrating operation of an embodiment dispersive optical component.

Referring to FIG. 1, a dispersive optical component 100 has a composition and structure that is designed to direct incident light 110 spanning a range of wavelengths into a range of discrete angular directions depending on the wavelength of the light. As illustrated, incident light 110 is composed of a broadband of wavelengths including four wavelengths, $\lambda_1, \lambda_2, \lambda_3, \lambda_4$. This light is incident on one side of component 100 propagating in the z-direction. As the light traverses the component, the component scatters the light so that the different component wavelengths are directed into different directions when they exit the component. In particular, light at wavelength $\lambda_1$ (see spectral inset 121) scatters into a first direction 120 with corresponding azimuthal and polar angles ($\lambda_1, \lambda_1$). Similarly, light at wavelength $\lambda_2$ (see spectral inset 123) scatters into a first direction 122 with corresponding azimuthal and polar angles ($\lambda_2, \lambda_2$), light at wavelength $\lambda_3$ (see spectral inset 125) scatters into a first direction 124 with corresponding azimuthal and polar angles ($\lambda_3, \lambda_3$), and light at wavelength $\lambda_4$ (see spectral inset 127) scatters into a first direction 126 with corresponding azimuthal and polar angles ($\lambda_4, \lambda_4$).

In general, the value of wavelengths $\lambda_1, \lambda_2, \lambda_3, \lambda_4$ will depend on the specific application for which optical component 100 is being designed, but these wavelengths can generally span different regions of the electromagnetic spectrum. For example, the wavelengths can be in the infrared, visible, and/or ultraviolet parts of the spectrum. The range spanned by the wavelengths (e.g., corresponding to $\lambda_4 - \lambda_1$ in the present example) can vary depending on the specific implementation too. In some implementations, the discrete wavelengths can span a very narrow band of wavelengths (e.g., 10 nm or less, 2 nm or less, 1 nm or less, 0.1 nm or less). Conversely, in certain applications, the range spanned can be large (e.g., 100 nm or more, 200 nm or more, 500 nm or more, 1,000 nm or more).

Generally, the materials of which component 100 is formed are compatible with the operative wavelengths (e.g., have low absorption at the operative wavelengths) and are compatible with each other and the manufacturing methods available.

Figure 2A:
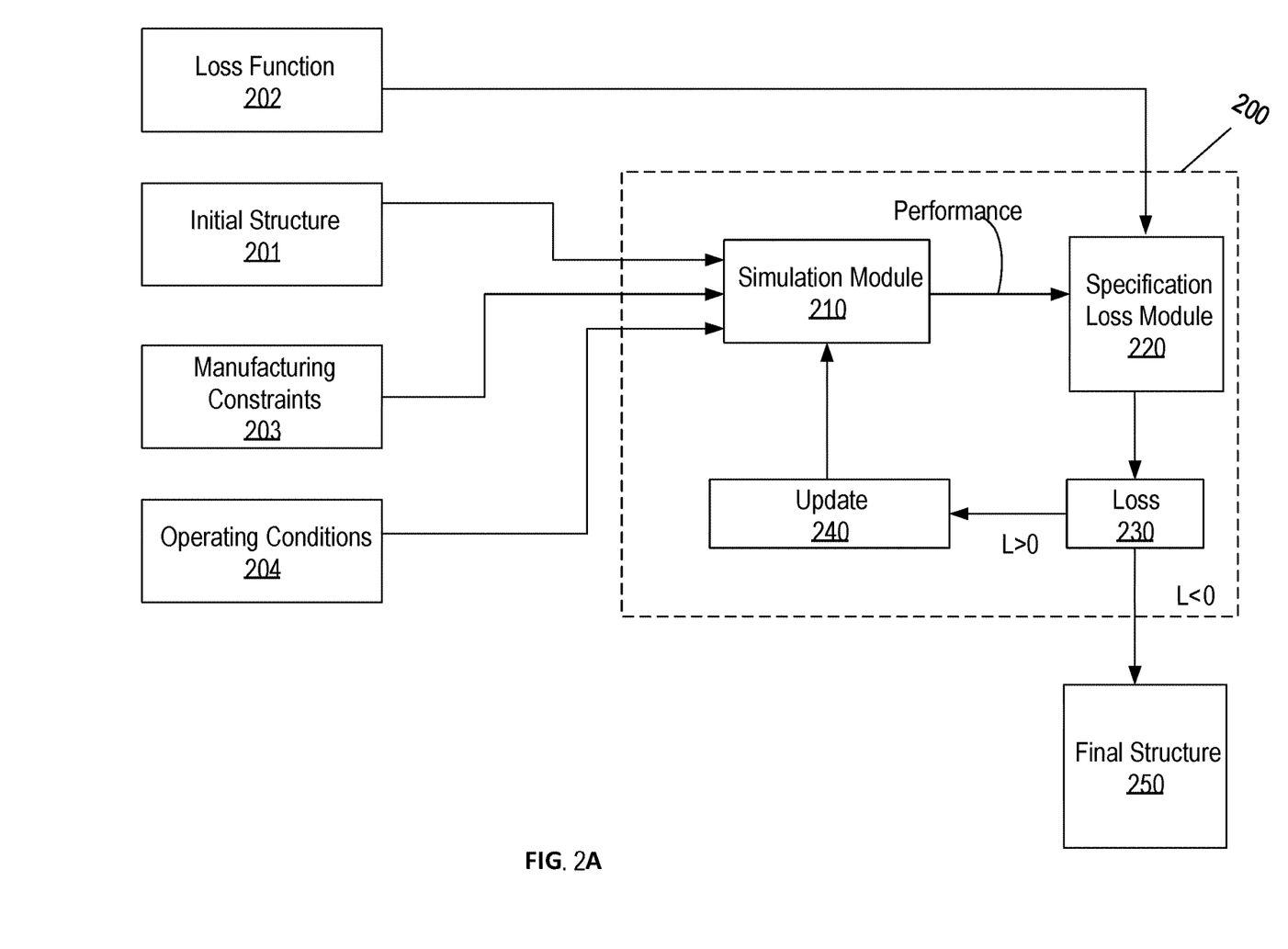
FIG. 2A is a flow chart showing operation of an inverse design tool.
Figure 2B:
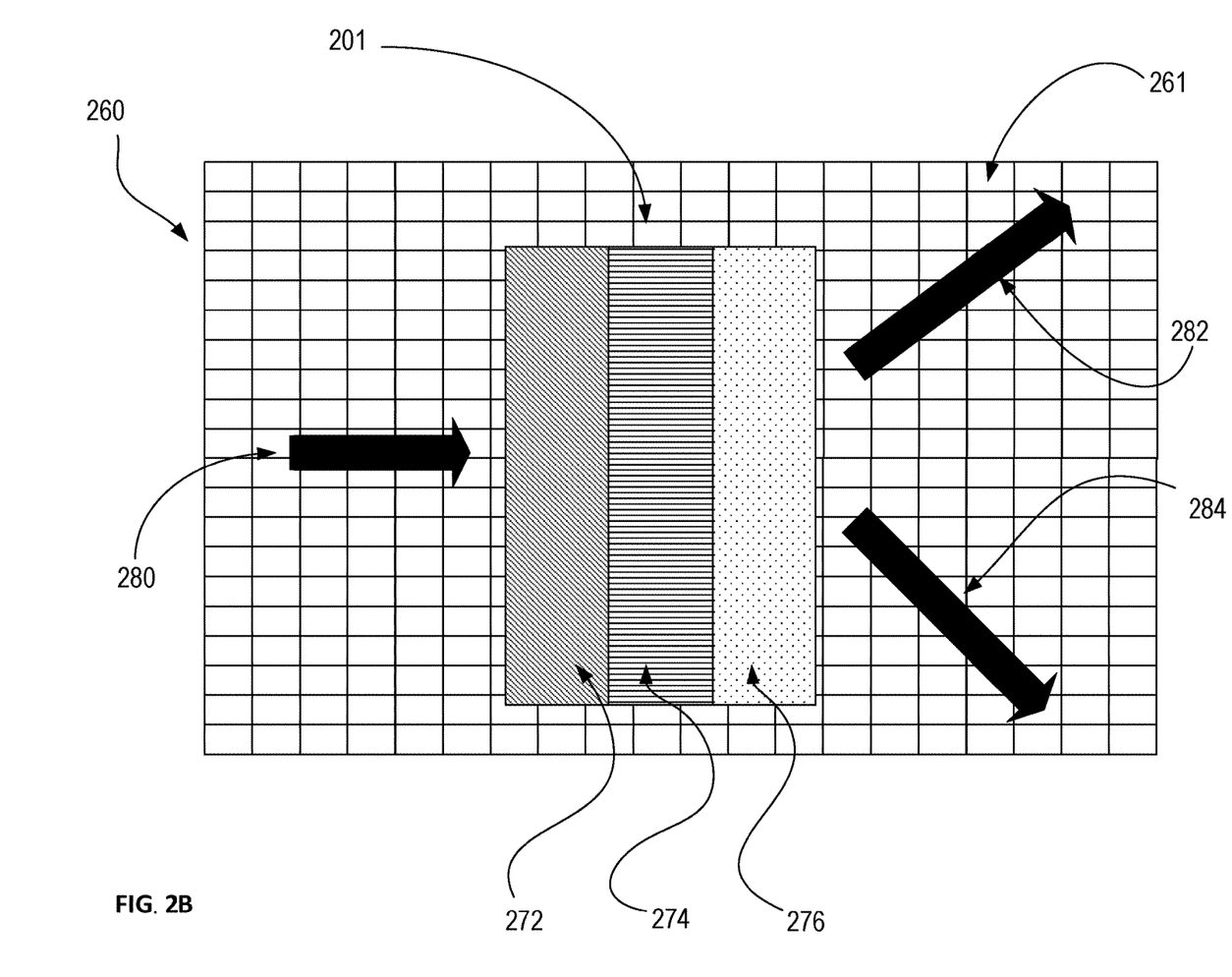
FIG. 2B is a schematic diagram showing aspects of an implementation of the inverse design tool shown in FIG. 2A.

Referring to FIGS. 2A and 2B, the structure of dispersive optical component 100 is determined using a design tool 200, which refers to a computational engine that determines a design for the optical device that satisfies pre-specified performance criteria, in this case scattering incident light 110 into different directions (120, 122, 124, and 126) depending on the wavelength of the incident light. Such an approach to design is referred to as "inverse design" and the computational engine for solving such problems is referred to as an "inverse design tool."

In certain implementations, the inverse design problem involves having a designer specify the performance criteria for the optical device in terms of a "loss function," L (also sometimes referred to a "cost function"), which represents a variation of the performance of a given design for the optical device from the specified performance. When L is below a specified threshold, e.g., L≤0, for a given design, it signifies that the specified performance has been met. By appropriately defining the loss, the inverse problem can therefore be expressed as finding a design, z, for the optical device which satisfies L≤0.

Inverse design problems can be solved computationally through a combination of a simulation module and a loss module. The simulation module is used to mathematically model a physical system incorporating a given design for the optical device using equations that describe the physical properties of the physical system, such as Maxwell's equations. The simulation module can also mathematically account for constraints involved in manufacturing (e.g., structure sizes and shapes and material properties) and operating the device (e.g., thermal effects). The loss module determines the loss for a particular design, effectively evaluating the performance of the device compared to the desired performance.

FIG. 2A shows an architecture for a computational inverse design tool 200 that uses a simulation module 210 and a loss module 220 to iteratively simulate the performance of an optical device and determine a loss 230 for the device. Depending on whether the loss exceeds (e.g., L>0) or meets (e.g., L≤0) a specified threshold value, the design tool can either update (240) a structure of the device or produces a final structure 250 for the device.

The design tool 200 uses a number of input parameters from a user in order to determine a final structure for the device. These include an initial structure 201 for the optical device, a loss function 202, manufacturing constraints 203 and operating conditions 204. Initial structure 201 generally includes a starting point for the composition and dimensions for the optical device. Loss function 202 is based on the desired performance of the optical device and is typically defined by a desired electric field profile. In many cases, the desired electric field profile corresponds to an electric field output by the optical device in response to a particular input or inputs. Manufacturing constraints 203 incorporate constraints based on practical manufacturing considerations. For example, manufacturing constraints can be associated with an amount of spacing between components, size of one or more components (e.g., size in one dimension, e.g., width, and/or overall size, e.g., volume), radius of curvature of one or more components, maximum cost of potential materials, availability of potential materials, and so forth. Operating conditions 204 account for other physical properties of the system, such as sources or sinks of electromagnetic fields, operating temperature, etc.

Before discussing the application of the inverse design tool to dispersive optical components, it is instructive to consider the example of a simple beam splitter. FIG. 2B shows an initial structure for a beam splitter as defined within a simulation space. Referring also to FIG. 2B, generally, initial structure 201 of the optical device is defined within a simulation space 260 composed of voxels 261. Voxels are three-dimensional volume elements at which physical properties (e.g., refractive index, field values, and temperature) can be defined and/or calculated. Each voxel 261 can be sub-wavelength (e.g., 0.5λ, or less, 0.2λ, or less, 0.1λ, or less, 0.05λ, or less) for a particular wavelength of interest in at least one dimension. In many cases, voxels are sub-wavelength in three dimensions.

As illustrated, initial structure 201 is composed of three regions 272, 274, and 276 each composed of a different material. Each extends across multiple voxels. Arrow 280 represents an input electromagnetic field incident on one side of initial structure 201. This field is a component of operating conditions 204, input into the simulation module. Arrows 282 and 284 represent the desired performance (e.g., the desired electric field profile output by the optical device in response to the input electromagnetic field) of the optical device and the loss can be established as a difference, on a voxel by voxel basis, between the electromagnetic field represented by these arrows and the electromagnetic field that results from the interaction between the input electromagnetic field and initial structure 201.

Referring again to FIG. 2A, simulation module 210 determines the performance of the optical device using a differentiable solver for Maxwell's equations to model electromagnetic fields resulting from the one or more sources interacting with the structure defined for the optical device. In one form, Maxwell's equations can be expressed as:

$$\frac{\partial H}{\partial t} = -\frac{1}{\mu}(\nabla \times E - M_{source}); \text{ and}$$

$$\frac{\partial E}{\partial t} = \frac{1}{\epsilon}(\nabla \times H - J_{source}),$$

where E and H represent electric and magnetic fields, ε and μ represent permittivity and permeability of the material at each voxel, and $J_{source}$ and $M_{source}$ are electric and magnetic currents. Numerical solution of Maxwell's equations yields electric and magnetic field values at each voxel, from which design tool 200 can calculate loss 230 for each voxel using loss module 220.

In some embodiments, a finite difference time domain (FDTD) approach is used to solve Maxwell's equations. Details of such an approach can be found, for example, in *Computational Electrodynamics: the Finite-Difference Time-Domain Method*, Third Edition, by A. Taflove and S. C. Hagness (Artech House, 2005). Such an approach involves updating values of the electric and magnetic fields at each voxel through a series of incremental time steps. Mathematically, this update operation can be expressed by a function φ, where $$x_{i+1} + \phi(x_i, b_i, z)$$

for i=1, ..., n. Here, n is the total number of time steps for the simulation, $x_i$ refers to the electric and magnetic fields at time step i, $b_i$ represents electric and magnetic sources at time step i, and z is a structural variable, corresponding to the topology of the optical device. Additionally, the loss operation can be expressed as L=f($x_1$, ..., $x_n$) and takes as input all the computed fields and produces a single, real-valued scalar that can be minimized.

In such implementations, inverse design tool 200 can optimize a structure for the optical device (i.e., final structure 250 in FIG. 2A) based on a structural gradient, $$\frac{\partial L}{\partial z}$$

according to the formalism above. This structural gradient can be determined according to the relationship:

$$\frac{dL}{dz} = \sum_i \frac{\partial L}{\partial x_i} \frac{\partial x_i}{\partial z}.$$

The above calculations can be performed using a convolutional neural network formalism wherein the matrices representing the FDTD set of equations are sparsely populated such that the calculations can be efficiently performed using one or more tensor processing units.

The loss function, L, for a dispersive optical component can be established in a variety of ways but generally involves defining a desired electric field distribution (or corresponding measure of electric field strength, such as intensity) at multiple wavelengths (or, correspondingly, frequencies) and comparing a simulated electric field distribution to the desired distribution at each of those wavelengths. The comparison can involve simply determining a difference at each voxel for which the desired distribution is defined or a difference of squares.

The loss function is generally defined as at least a plurality of operational wavelengths of the component. For example, in applications where the device is expected to operate at a number of discrete wavelengths of interest, the loss function can incorporate the performance of the device at each of these wavelengths. The number of wavelengths can vary as necessary. For example, some applications can include a large number of wavelengths (e.g., 20 or more wavelengths, 50 or more wavelengths, 100 or more wavelengths) spanning a range of operational wavelengths. Alternatively, the loss function can be defined for a representative subset of the operational wavelengths. For instance, where the operational wavelengths span a range of wavelengths, the loss function can be evaluated for a finite number of discrete wavelengths spanning (e.g., evenly spanning) the operational range.

Referring back to FIG. 1, as an example, an exemplary loss function can include components at the four operational wavelengths ($\lambda_1$ to $\lambda_4$), where each component has a high relative intensity along its corresponding direction, but low intensity elsewhere.

Generally, the electric field parameter (e.g., E-field magnitude or intensity) can be defined for the entire simulation space or just a subset thereof. For example, in some embodiments, the loss function can be evaluated for near field emission from the component (e.g., within a Rayleigh wavelength of the component). Alternatively, or additionally, the loss function can be evaluated in the far field (e.g., more than a Rayleigh wavelength, such as at least 10 times a Rayleigh wavelength).

In some implementations, the loss function can be calculated for each of a number of different electromagnetic modes (e.g., spatial modes, polarization modes) input into the optical component. Loss function evaluation can account for modal overlap and the loss function can penalize modes that are not desired. For example, in some cases it may be desirable to have as much of the power as possible to be in the fundamental TE mode of a waveguide, rather than the fundamental TM mode, which may also be supported by the waveguide. As a further example, mode conversion can happen quite readily in certain devices that operate at a high mode number. In that case, it can be both an advantage (e.g., where the mode conversion occurs between or into desirable modes) and/or a disadvantage (e.g., if there are many modes possible for parameters close to those considered desirable). In such cases, mode conversion between or into undesirable modes can be penalized by the loss function.

In addition, or as an alternative, to the example loss function described above, generally loss functions can include: a total amount of power coupled into a certain direction or material, regardless of what mode the power is in; an amount of power absorbed by a detector (e.g., when designing a photodetector); and/or an amount of power transferred to a target wavelength (e.g., when designing nonlinear devices). More generally, other loss functions can be established that measure the distinguishability of two or more modes in a general way.

In general, the initial structure for a dispersive optical component (e.g., dispersive optical component 100) can be any structure composed of one or more optical materials (e.g., dielectric materials) capable of interacting with the operative wavelengths for the system having a form factor appropriate for the particular application for which the component is to be used. For example, the size and shape of the initial structure of the component can be set according to budgeted space for the component within a larger system. For example, in some embodiments, the initial structure can be a largely planar structure. Such form factors can be useful where the component is to be integrated with other planar photonic or electro-optic devices. In certain embodiments, the form factor can be suitable for integrating in fiber optic systems. For instance, the component can include an input surface for receiving input light having a size and shape suitable for the output from a fiber waveguide. Form factors for free-space optical devices are also possible. In certain embodiments, the initial structure is itself dispersive for at least some of the operational wavelengths. For example, initial structures can include one or more gratings having properties suitable for dispersion of one or more of the operational wavelengths.

Figure 3:
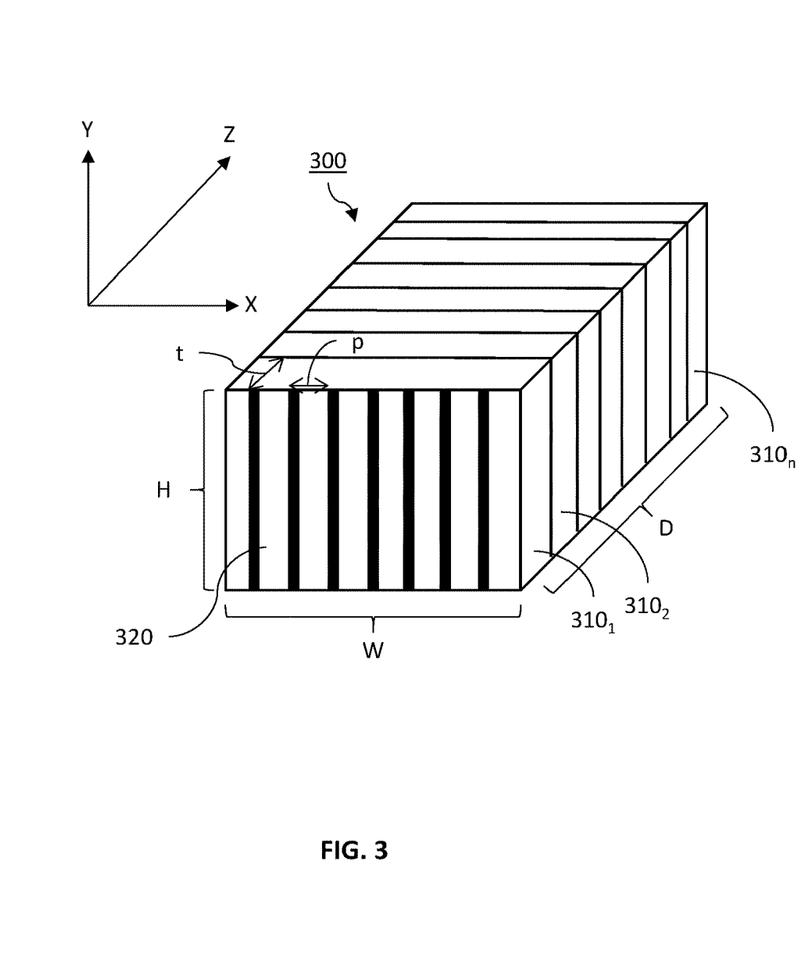
FIG. 3 is a schematic diagram of an embodiment of an initial structure for a dispersive optical component to be designed using inverse design techniques.

Referring to FIG. 3, an exemplary initial structure for a dispersive optical component is component 300, which is composed of a rectangular cuboid composite element composed of a number of layers, $310_1, \ldots, 310_n$, arranged along the z-axis. The rectangular cuboid is configured to received input radiation propagating along a z-axis at a first surface 320. For the Cartesian coordinate system illustrated, component 300 has a depth, D, along the z-axis, a width, W, along the x-axis, and a height, H, along the y-axis. Each of these dimensions can be constrained to their initial values during the optimization process, or can be parameters that are allowed to vary (e.g., within prescribed ranges).

Each layer $310_i$ has a thickness, t, measured along the z-axis, and is itself a grating having a refractive index variation with a pitch, p, in the x-direction. Each layer can be composed of two or more materials having differing refractive indexes at the operative wavelengths. In some embodiments, each layer corresponds to one of the operational wavelengths of the dispersive optical component. The refractive index profiles of each grating can be smoothly varying (e.g., sinusoidal) or discontinuous (e.g., a square wave). In each case, the grating's pitch, p, can be constant or the grating can be chirped. The gratings in different layers can be oriented differently (e.g., alternative gratings along the x-direction and y-direction) or can be the same. In some embodiment, two dimensional gratings (e.g., with a varying refractive index along the x- and y-directions) are possible.

Generally, the composition and dimensions (e.g., thickness, pitch, etc.) are parameters that can be varied during the inverse design process and the final design is not constrained to retain a period refractive index profile at all. Rather, the inverse design tool will determine a topology for the overall component on a voxel-by-voxel basis.

Generally, the simulations can account for additional factors too, such as the dispersion of each modeled material across the operational range of wavelengths. As another example, the temperature dependence of the component can be accounted for too. For instance, the performance of the component under different scenarios can be modeled, each corresponding to a different temperature. This can involve accounting for thermo-optical effects (e.g., refractive index dependence on temperature) and/or thermo-mechanical effects (e.g., expansion or contraction of the component as a function of temperature). In some embodiments, accounting for thermal effects can include determining thermal effects due to absorption of incident light.

In some cases, dispersive optical components can be composed of multiple sub-components each designed at least partially independently of one another. For example, referring to FIG. 4, a dispersive optical component 400 includes multiple sub-components each designed to receive input light from an external source or from the output of a preceding sub-component. Specifically, in the illustrated example, component 400 includes four layers (410, 420, 430, and 440) that are sequentially arranged along a light propagation direction. Overall, component 400 is designed to receive collimated input light at eight discrete wavelengths ($\lambda_1, \lambda_2, \lambda_3, \lambda_4, \lambda_5, \lambda_6, \lambda_7, \lambda_8$) and to disperse this light so that each wavelength is directed into a different direction. The first layer 410 splits the light into two beams, one composed of light at ($\lambda_1, \lambda_2, \lambda_3, \lambda_4$) and a second composed of light at ($\lambda_5, \lambda_6, \lambda_7, \lambda_8$). The first beam is incident on a first sub-component $420_1$ in the second layer and the second beam is incident on a second sub-component $420_2$. Sub-component $420_1$ splits the incident beam into two more beams according to their wavelengths, directing a first beam composed of light at ($\lambda_1, \lambda_2$) in one direction and a second beam composed of light at ($\lambda_3$, $\lambda_4$) in another direction. Similarly, sub-component $420_2$ splits the incident beam into two more beams according to their wavelengths, directing a first beam composed of light at ($\lambda_5$, $\lambda_6$) in one direction and a second beam composed of light at ($\lambda_7$, $\lambda_8$) in another direction. In layer 430, which is composed of four sub-components $430_{1,\ldots,4}$, each of which receives a corresponding beam from layer 420 and splits each beam into its constituent wavelengths, directing each in a different corresponding direction. Finally, layer 440 is composed of eight sub-components $440_{1,\ldots,8}$, each of which receives a corresponding beam from layer 430 and directs that beam into a corresponding direction, providing the ultimate output from component 400.

Figure 4:
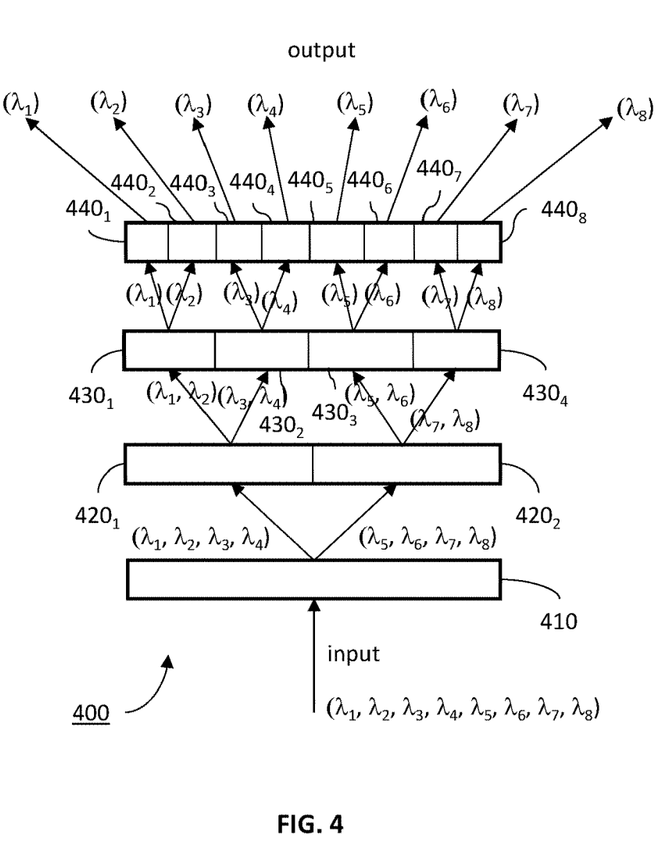
FIG. 4 is a schematic diagram of another embodiment of an initial structure for a dispersive optical component to be designed using inverse design techniques.

In general, each layer and/or each sub-component can be optimized separately or the entire component can be optimized together. The spacing between each layer can also be defined as a parameter for optimization. Where each sub-component is optimized separately, a separate loss function corresponding to the output of corresponding sub-component is defined and the structure of the sub-component is determined subject to an input field corresponding to the output of the preceding component.

While the foregoing examples feature a dispersive component designed to scatter different wavelengths into different directions, more generally components can be designed to selectively scatter light based on other criteria in addition, or alternatively, to the light's wavelength. For example, dispersive components can scatter light having different polarization states in different directions. Moreover, while each of the foregoing examples features a loss function in which each wavelength is scattered into a single direction, in certain embodiments dispersive components can be designed in which a single wavelength can be dispersed into more than one direction.

Figure 5:
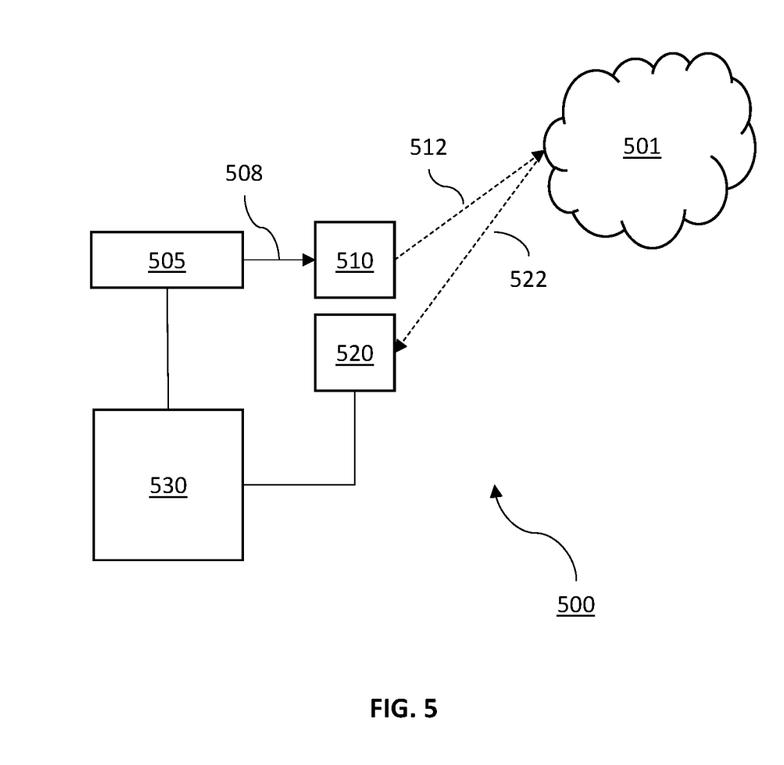
FIG. 5 is a schematic diagram of an embodiment of a LIDAR system using a dispersive optical component designed using inverse design techniques.

In general, dispersive optical components can be used in a variety of applications. In particular, the components can be used in applications involving controllably directing light into different optical modes, such as optical sensing and optical imaging applications. For example, a dispersive optical component designed using the foregoing techniques can be used in a LIDAR system. Referring to FIG. 5, a LIDAR system 500 includes a light source 505, a dispersive optical component 510, and a detector 520. Light source 505 and detector 520 are in communication with an under the control of an electronic controller 530. During operation, electronic controller 530 causes light source 505 to direct light 508 at multiple different wavelengths to dispersive optical component 510, which directs the light into a specific direction depending on its wavelength, as illustrated by light 512. At least some of light 512 is scattered from an object 501, and some of the scattered light 522 is detected by detector 520. Controller 530 correlates the detected light with the direction of light 512 from dispersive optical component 510, allowing system 500 to determine the direction of object 501 relative to the system. Ranging techniques, such as time-of-flight techniques, can be used to enable the system to determine the distance to object 501 in addition to its direction.

By sweeping through the multiple wavelengths from light source 505, each of which is scattered into a corresponding distinct direction, system 500 can scan an entire space and detect and range any objects within its field of view. Generally, the multiple wavelengths can be swept sequentially or multiplexed. For example, in some embodiments, light source 505 is a broadband source that illuminates component 510 with light at the multiple wavelengths simultaneously. Component 510 scatters each wavelength into a respective direction and detector 520 detects light scattered at each of the scattered wavelengths. Detector 520 includes a wavelength demultiplexer in order to simultaneously or sequentially detect and differentiate between light at each of the multiple wavelengths. For example, detector 520 can include a passive demultiplexer, such as a grating or other dispersive optical element, that directs light at different wavelengths to a different detector element in a multi-element detector. Alternatively or additionally, detector 520 can include a color filter array that selective transmits or reflects light at different wavelengths to a sensor element. Active demultiplexers, e.g., using a scanning mirror, can also be used.

While the foregoing examples of dispersive optical components are depicted as transmissive optical components, other arrangements—such as reflective optical components—are also possible.

Use of a dispersive optical component such as component 510 in LIDAR system 500 can be particularly advantages in applications that conventionally rely on actuators (e.g., MEMS mirrors) and/or electrically-, acoustically- or thermally-tuned arrays of output gratings in order to achieve wavelength dispersion.

In some aspects, implementations described in the present disclosure may rely on machine learning engines and machine learning algorithms to perform generative design tasks. Generative design may, in some aspects, mimic an evolutionary problem-solving process, which uses inputs such as design goals, computes hundreds (if not thousands or millions) of potential solutions, and selects one or more best solutions from the multitude of solution permutations. Indeed, in some aspects, machine learning engines applied to a generative design process may generate or process thousands—or even millions—of design choices, test configurations and learn from each iterative solution. Thus, aspects of the described implementations may use the machine learning engines in a generative design process to generate unique and bespoke solutions beyond those that a human being, alone, could create, to arrive at the best design solution. In some aspects, the machine learning engines and algorithms of the generative design process may rely on algorithmic and parametric modeling within a process that includes a design schema, one or more machine learning engines configured to create variations, and one or more machine learning engines configured to select desirable outcomes.

Figure 6:
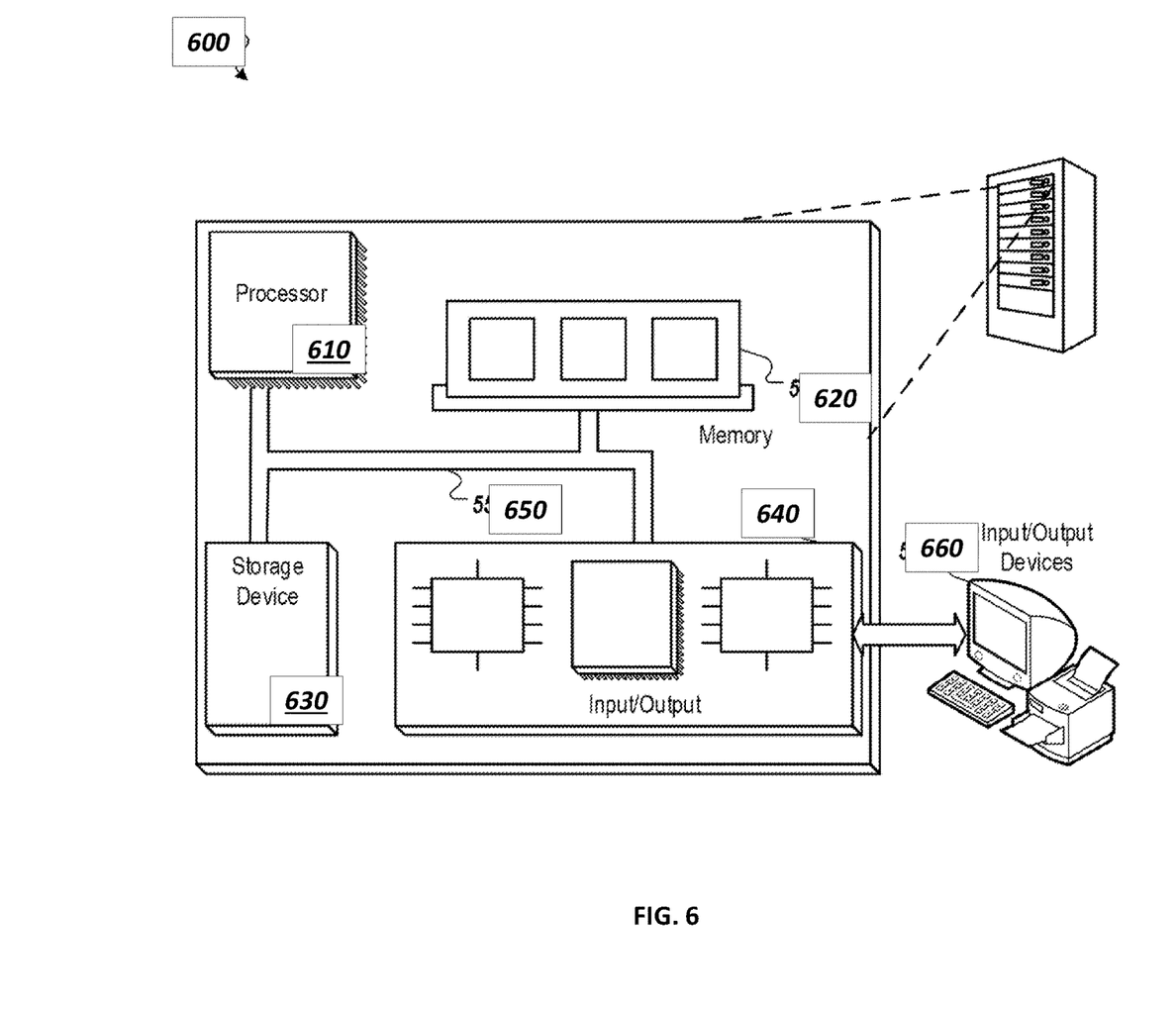
FIG. 6 is a schematic diagram of an embodiment of a computer system for implementing inverse design techniques for designing a dispersive optical component.

FIG. 6 is a schematic diagram of an example computer system 600. The system 600 can be used to carry out the operations described in association with any of the computer-implemented methods described previously, according to some implementations. In some implementations, computing systems and devices and the functional operations described in this specification can be implemented in digital electronic circuitry, in tangibly-embodied computer software or firmware, in computer hardware, including the structures disclosed in this specification (e.g., machine learning engine(s)) and their structural equivalents, or in combinations of one or more of them. The system 600 is intended to include various forms of digital computers, such as laptops, desktops, workstations, personal digital assistants, servers, blade servers, mainframes, and other appropriate computers, including vehicles installed on base units or pod units of modular vehicles. The system 600 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. The processor may be designed using any of a number of architectures. For example, the processor 610 may be a CISC (Complex Instruction Set Computers) processor, a RISC (Reduced Instruction Set Computer) processor, or a MISC (Minimal Instruction Set Computer) processor.

In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, Central Processing Units (CPUs), Graphics Processing Units (GPUs), and/or Tensor Processing Units (TPU's) can be used. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display) monitor, or OLED (organic light emitting diode) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for making a dispersive optical component, the method comprising:
    specifying a target dispersion profile for the dispersive optical component;
    designing, using a computer system, a structure for the dispersive optical component based on the target dispersion profile, the designing comprising:
        defining a loss function within a simulation space composed of a plurality of voxels, the simulation space encompassing one or more optical interfaces of the dispersive optical component, the loss function corresponding to the target dispersion profile for the dispersive optical component, the target dispersion profile comprising a relationship between a scattering angle and a wavelength of an incident electromagnetic field for three or more different operative wavelengths;
        defining an initial structure for the one or more optical interfaces in the simulation space, at least some of the voxels corresponding to each optical interface having a dimension smaller than a smallest operative wavelength of the dispersive optical component, wherein the dispersive optical component comprises a multilayered transmission grating;
        determining, using a computer system, a structure for each optical interface using a finite-difference time domain solver to solve Maxwell's equations so that a loss determined according to the loss function is above a specified threshold; and
    manufacturing the dispersive optical component according to the structure for the dispersive optical component.

2. The method of claim 1, wherein the target dispersion profile comprises directing electromagnetic radiation at different wavelengths into different scattering angles for each of the plurality of operative wavelengths in response to illuminating the dispersive optical component with an input electromagnetic field comprising each of the plurality of operative wavelengths.

3. The method of claim 1, wherein the target dispersion profile is defined for a near field electromagnetic field exiting the dispersive optical component.

4. The method of claim 1, wherein the target dispersion profile is defined for a far field electromagnetic field exiting the dispersive optical component.

5. The method of claim 1, wherein the loss is determined from the loss function for each of a plurality of electromagnetic modes of the incident electromagnetic field at each of the operative wavelengths.

6. The method of claim 1, wherein the initial structure comprises a first sub-structure dispersive for an incident electromagnetic field with at least one of the operative wavelengths.

7. The method of claim 6, wherein the first sub-structure comprises a grating.

8. The method of claim 1, wherein determining the structure comprises determining a refractive index at each voxel corresponding to the dispersive optical component.

9. The method of claim 8, wherein the refractive index at each voxel corresponds to a refractive index of one or more pre-identified optical materials.

10. The method of claim 9, wherein the pre-identified optical materials comprise dielectric materials and/or semiconductor materials.

11. The method of claim 1, further comprising defining one or more manufacturing constraints, wherein the structure is determined subject to the one or more manufacturing constraints.

12. The method of claim 11, wherein the one or more manufacturing constraints comprise constraints on values of refractive index at each voxel, the refractive index values corresponding to materials suitable for forming the dispersive optical component.

13. The method of claim 11, wherein the one or more manufacturing constraints comprise constraints on feature dimensions of the dispersive optical component.

14. The method of claim 13, wherein the feature dimensions include one or more dimensions selected from the group of feature dimensions consisting of: radius of curvature, width, and volume.

15. The method of claim 1, wherein the dispersive optical component is a transmissive optical component.

16. The method of claim 1, wherein the dispersive optical component is a reflective optical component.

17. The method of claim 1, wherein the operative wavelengths comprise infrared wavelengths.

18. The method of claim 1, wherein the operative wavelengths correspond to wavelengths from a broadband light source.

19. The method of claim 1, wherein at least some of the voxels are smaller than the operative wavelengths in three orthogonal dimensions.

* * * * *